United States Patent
Sugiura et al.

(10) Patent No.: US 8,500,900 B2
(45) Date of Patent: Aug. 6, 2013

(54) NON-CURABLE COATING COMPOSITION

(75) Inventors: Tsunehito Sugiura, Ichihara (JP); Taichi Kuroda, Fujisawa (JP)

(73) Assignee: Dow Corning Toray Co., Ltd., Chiyoda-ku, Tokyo (JP)

( * ) Notice: Subject to any disclaimer, the term of this patent is extended or adjusted under 35 U.S.C. 154(b) by 134 days.

(21) Appl. No.: 13/125,246

(22) PCT Filed: Oct. 20, 2009

(86) PCT No.: PCT/JP2009/068308
§ 371 (c)(1),
(2), (4) Date: Jul. 7, 2011

(87) PCT Pub. No.: WO2010/047409
PCT Pub. Date: Apr. 29, 2010

(65) Prior Publication Data
US 2011/0259241 A1    Oct. 27, 2011

(30) Foreign Application Priority Data
Oct. 22, 2008    (JP) ................. 2008-271825

(51) Int. Cl.
| | |
|---|---|
| C09D 191/00 | (2006.01) |
| C07D 303/02 | (2006.01) |
| B32B 27/38 | (2006.01) |
| C08L 63/00 | (2006.01) |
| C08L 83/04 | (2006.01) |

(52) U.S. Cl.
USPC ............... 106/287.13; 252/8.62; 252/8.61; 428/413; 428/447; 525/476

(58) Field of Classification Search
None
See application file for complete search history.

(56) References Cited

U.S. PATENT DOCUMENTS
4,366,001 A    12/1982    Ona et al.

FOREIGN PATENT DOCUMENTS
| EP | 1473405 A1 | 11/2004 |
|---|---|---|
| JP | 4130190 A | 5/1992 |
| JP | 07292382 | 11/1995 |
| JP | 10-053962 | * 2/1998 |
| JP | 2000096476 | 4/2000 |
| JP | 2003213587 | 7/2003 |
| JP | 2005-281583 | * 10/2005 |

OTHER PUBLICATIONS

English language abstract for JP 4130190 extracted from the espacenet.com database on Jul. 29, 2011 6 pages.
English language abstract and translation for JP 07292382 extracted from the PAJ database on Jul. 29, 2011, 30 pages.
English language abstract and translation for JP 2000096474 extracted from the PAJ database on Jul. 29, 2011, 45 pages.
English language abstract and translation for JP 2003213587 extracted from the PAJ database on Jul. 29, 2011, 55 pages.

(Continued)

Primary Examiner — Yun Qian
(74) Attorney, Agent, or Firm — Howard & Howard Attorneys PLLC

(57) ABSTRACT

A non-curable coating composition which uses a modified silicone having a functional group and can effectively prevent or reduce adhesion of sticky contamination substances to the surface of a substrate is provided. The non-curable coating composition contains a carboxy-modified silicone having carboxy-containing groups at side chains, and an epoxy/oxyalkylene-modified silicone having an epoxy-containing group and an oxyethylene-containing group at side chains, in a weight ratio ranging from 1:2 to 1:30.

11 Claims, 1 Drawing Sheet

(56) References Cited

OTHER PUBLICATIONS

International Search Report for Application No. PCT/JP2009/068308 dated Oct. 20, 2009, 3 pages.

International Search Report for Application No. PCT/JP2009/068308 dated Feb. 18, 2010, 3 pages.

* cited by examiner

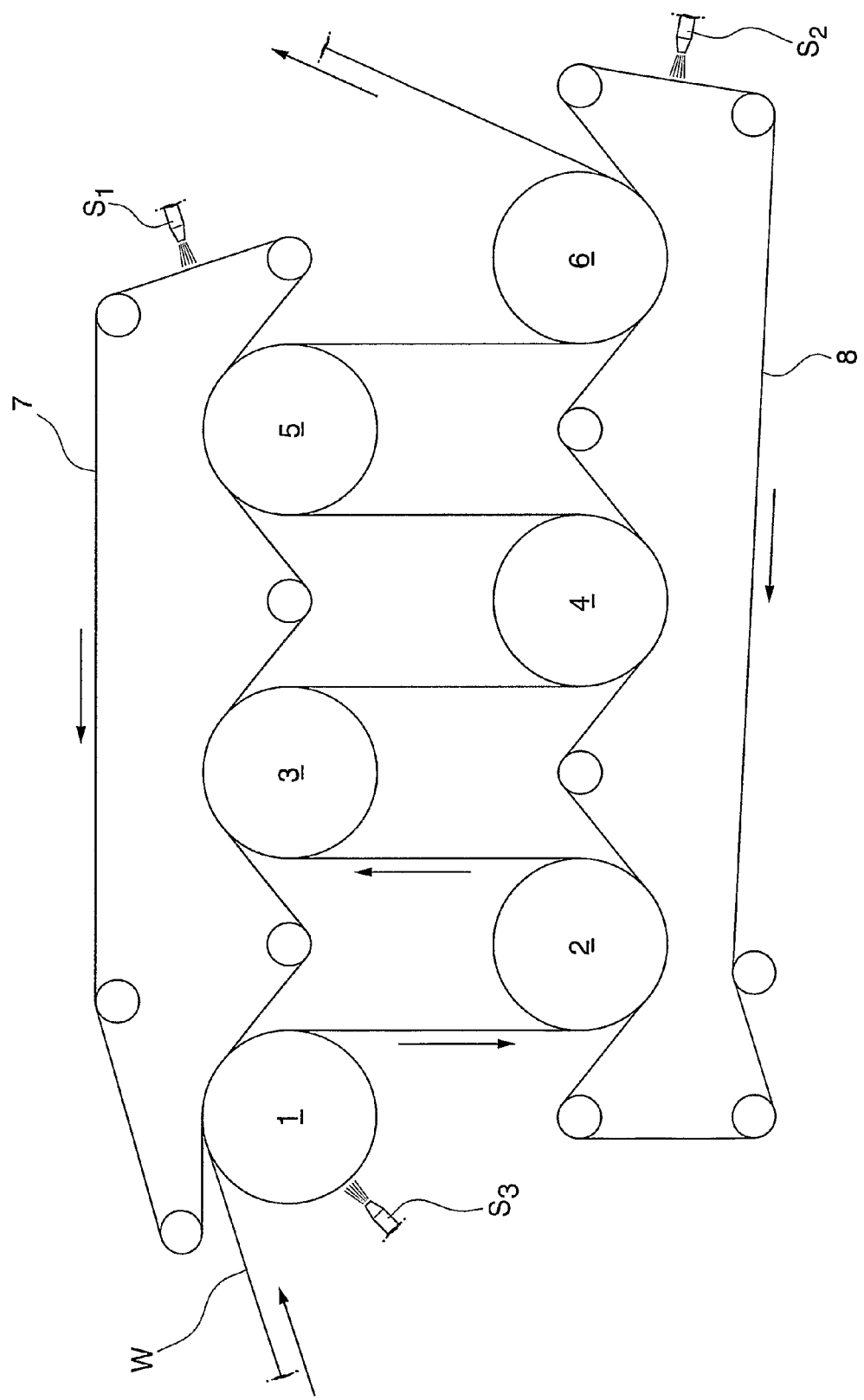

NON-CURABLE COATING COMPOSITION

RELATED APPLICATIONS

This application claims priority to and all the advantages of International Patent Application No. PCT/JP2009/068308, filed on Oct. 20, 2009, which claims priority to Japanese Patent Application No. JP 2008-271825, filed on Oct. 22, 2008.

TECHNICAL FIELD

The present invention relates to a non-curable coating composition which is used for preventing adhesion of various adherent substances to the surfaces of substrates.

Priority is claimed on Japanese Patent Application No. 2008-271825, filed on Oct. 22, 2008, the content of which is incorporated herein by reference.

BACKGROUND ART

At the time of forming and processing of adherent substances such as food products, adhesives, asphalt, tar, plastics, rubbers, and the like, various coating agents are used in order to prevent adhesion of the aforementioned adherent substances or contaminants to various substrates.

For example, various coating agents have been used for packaging materials for frozen meals; surface treatments for food preparation tools such as flying pans, toasters and the like; mold release agents for use in molds for forming plastics, rubbers and the like; interior treatments of paperboard containers for use in cooling and solidifying asphalt, tar and the like; and releasing agents for preventing adhesion between substrates coated by adhesives such as adhesive tapes, compression tapes, patches and the like. In addition, when recycled paper is produced by recycling waste paper, coating agents have also been used in order to prevent adhesion of various adherent components such as pitch, tar, ink and the like contained in waste paper, to press rolls, dryer rolls, canvases and the like of paper machines.

One of such aforementioned coating agents is curable coating agents in which the coating agent is applied to a substrate, followed by curing to form a non-adhesive layer, and another is non-curable coating agents in which the coating agent in the form of a liquid is applied to a substrate, as it is, to form a non-adhesive layer, followed by using as it is, without curing. The aforementioned surface treatments, interior treatments and releasing agents are curable coating agents. On the other hand, the coating agents used in the step for producing recycled paper belong to non-curable coating agents. As the aforementioned mold release agents, both curable types and non-curable types are known.

As examples of non-curable coating agents, the following patent applications are published and known.

Japanese Unexamined Patent Application, First Publication No. H04-130190 discloses a lubricant for cleaning the surface of a paper dryer comprising an oil-based substance and a surfactant, in which examples of the oil-based substances include polybutene, machine oil, liquid paraffin and the like. However, in order to form a non-adhesive layer composed of the aforementioned oil-based substances, it is necessary to use a large amount of oil-based substances. For this reason, there are economical problems. Therefore, in Japanese Unexamined Patent Application, First Publication No. H07-292382, a silicone oil formed from a polydimethylsiloxane is used in order to obtain a sufficient non-adhesive layer while reducing the amount of the oil-based substances, as much as possible.

In the silicone oil of a polydimethylsiloxane, oxygen atoms of the siloxane main-chain thereof are oriented to the surface of a substrate, and the methyl groups bonding to silicon atoms are oriented to the outside. For these reasons, when the silicone oil is applied to a substrate such as a press roll, a dryer roll, a canvas or the like of a paper machine, a non-adhesive layer formed from the aforementioned silicone oil can coat the surface of the substrate more strongly, but in fact, the silicone oil transfers to paper during the step of producing paper before reaching the aforementioned state. Thereby, sticky components in the waste paper may be adhered to the surface of the aforementioned substrate.

Therefore, an approach has been proposed in which a silicone oil having a functional group is used instead of the silicone oils formed from polydimethylsiloxanes. For example, Japanese Unexamined Patent Application, First Publication No. 2000-96476 proposes that various silicone oils are applied to canvases in paper machines, in which examples of the aforementioned silicone oils include, in addition to a methylphenylsilicone oil and a diethylsilicone oil, an amino-modified silicone oil, an epoxy-modified silicone oil, and a higher fatty acid-modified silicone oil. In addition, Japanese Unexamined Patent Application, First Publication No. 2003-213587 (Japanese Patent No. 3388450) proposes a method for preventing contamination on the surface of a dryer roll or canvas by means of forming a non-adhesive layer which is produced by spraying an oil-in-water (O/W) emulsion of an epoxy-modified silicone oil or an amino-modified silicone oil on the surface of a dryer roll or canvas during the step of producing paper.

DISCLOSURE OF INVENTION

Problems to be Solved by the Invention

In the case of using a modified silicone oil having a functional group with rich reactivity such as an epoxy group, an amino group, a carboxy group or the like as a coating agent for a substrate such as a press roll, dryer roll, canvas or the like of a paper machine, the aforementioned modified silicone oil is more useful, compared with a silicone oil of a polydimethylsiloxane since the modified silicone oil exhibit enhanced adhesiveness with respect to the surface of the aforementioned substrate. However, even if the modified silicones having the aforementioned functional groups are used, adhesion of adherent components such as pitch and the like to the surface of the aforementioned substrates cannot be instantly and sufficiently inhibited.

The present invention has an objective of providing a non-curable coating composition in which a modified silicone having a functional group is used, and adhesion of sticky substances to the surface of a substrate can be effectively prevented or reduced.

Means for Solving the Problems

The objective of the present invention can be achieved by a non-curable coating composition characterized by comprising:

a carboxy-modified silicone represented by the following general formula (1):

$$R_3SiO(R_2SiO)_m(RASiO)_nSiR_3 \qquad (1)$$

wherein
each R independently represents a $C_{1-6}$ alkyl group;
A represents a carboxy-containing group;

m represents an integer ranging from 0 to 1,000; and
n represents an integer ranging from 2 to 100,
and
an epoxy/oxyalkylene-modified silicone represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;
Y represents an oxyethylene-containing group;
p represents 0 or 1;
q represents 0 or 1;
x represents an integer ranging from 0 to 500;
y represents an integer ranging from 1 to 100; and
z represents an integer ranging from 1 to 300,
in a weight ratio ranging from 1:2 to 1:30.

The aforementioned carboxy-containing group is preferably represented by a formula: —$(CH_2)_l$—COOZ wherein Z represents H, an alkali metal or ammonium; and l represents an integer ranging from 0 to 12.

The aforementioned epoxy-containing group is preferably a glycidoxyalkyl group, an epoxycycloalkylalkyl group, or an oxyranylalkyl group.

The aforementioned oxyethylene-containing group is preferably represented by a formula: —$(CH_2)_r(OC_2H_4)_s$—$(OC_3H_6)_t$—B wherein B represents H, OH, OR, COOH or COOR wherein R has the same meaning as described above; r represents an integer ranging from 0 to 4; s represents an integer ranging from 1 to 200; t represents an integer of 0 or more, but less than 200; and $0 \leq t \leq s$.

The aforementioned weight ratio preferably ranges from 1:3 to 1:20.

The non-curable coating composition according to the present invention is preferably in the form of an oil-in-water emulsion or a water-in-oil emulsion.

The non-curable coating composition of the present invention can be used as a coating agent for forming a non-adhesive layer, or a contamination inhibitor for use in a paper machine.

Effects of the Invention

The non-curable coating composition of the present invention forms a non-adhesive layer on the surface of a substrate, and thereby, adhesion of sticky substances to the aforementioned surface can be effectively prevented or reduced. It is believed that the effects of the present invention may be provided, in particular, by means of balance between effects of forming a non-adhesive layer due to enhanced adhesiveness to the surface of the substrate which a carboxy-modified silicone possesses and effects of preventing adhesion of adherent substances which an epoxy/oxyalkylene-modified silicone possesses.

The non-curable coating composition of the present invention can be used as a non-curable coating agent with respect to various substrates. In particular, the non-curable coating composition can be applied to the surface of a press roll, dryer roll, canvas or the like of a paper machine, and thereby, adhesion of adherent contamination substances such as pitch, tar, ink and the like to the aforementioned surface can be effectively inhibited.

BRIEF DESCRIPTION OF THE DRAWINGS

FIG. 1 is a general cross-sectional view showing one embodiment of a general drying step of a paper machine.

BEST MODES FOR CARRYING OUT THE INVENTION

The non-curable coating composition of the present invention does not have properties of being cured due to heat or water, and in addition, is not necessary to be cured. The non-curable coating composition of the present invention is used for coating, as it is, and thereby, effects of the present invention can be exhibited. In addition, the non-curable coating composition of the present invention contains a carboxy-modified silicone having carboxy groups at the side chains and an epoxy/oxyalkylene-modified silicone having epoxy groups and oxyalkylene groups at the side chains in a specified ratio thereof.

The carboxy-modified silicone is represented by the following general formula (1):

$$R_3SiO(R_2SiO)_m(RASiO)_nSiR_3 \quad (1)$$

wherein
each R independently represents a $C_{1-6}$ alkyl group;
A represents a carboxy-containing group;
m represents an integer ranging from 0 to 1,000, and preferably represents an integer selected in order to have m+n ranging from 2 to 1,000, more preferably ranging from 300 to 1,000, and in particular, preferably ranging from 380 to 500; and
n represents an integer ranging from 2 to 100, and preferably represents an integer ranging from 2 to 20.

The $C_{1-6}$ alkyl groups are exemplified as straight-chain or branched-chain alkyl groups, such as a methyl group, an ethyl group, a n-propyl group, an isopropyl group, a n-butyl group, an isobutyl group a sec-butyl group, a tert-butyl group, a pentyl group, a hexyl group, and the like; In particular, a methyl group is preferable.

The aforementioned carboxy-containing group is preferably a group represented by the formula: —$(CH_2)_l$—COOZ wherein Z represents H, an alkali metal or ammonium; and l represents an integer ranging from 0 to 12 and preferably represents an integer of 0 or 3 to 11. As examples of the aforementioned alkali metals, mention may be made of sodium, potassium and the like. In view of stability of a composition and the like, X is preferably an alkali metal or ammonium.

As carboxy-modified silicones, in addition to the type having carboxy groups in at least side chains of the polysiloxane main-chain (side chain type), there is a type having carboxy groups only at both ends (both end type). In the present invention, the side chain type is used. The both end type can have only two carboxy groups per molecule, and for this reason, it is difficult to ensure adhesiveness to the surface of the substrate. Therefore, the usage amount is increased, as compared to the usage amount in the case of the side chain type, and it is difficult to control adhesiveness to the surface of the substrate. In contrast, the side chain type has a relatively large amount of carboxy groups, and for this reason, it is relatively easy to control adhesiveness by controlling the usage amount thereof.

As the aforementioned carboxy-modified silicone, for example, $(CH_3)_3SiO[(CH_3)_2SiO]_m[CH_3\{HOOC(CH_2)_{2-10}\}SiO]_nSi(CH_3)_3$ wherein m and n have the same meanings as defined above, with the proviso that m+n is within a range of 380 to 500, can be used.

The aforementioned epoxy/oxyalkylene-modified silicone is represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;

Y represents an oxyethylene-containing group;
p represents 0 or 1;
q represents 0 or 1;
x represents an integer ranging from 0 to 500, preferably ranging from 0 to 120, and more preferably ranging from 3 to 50;
y represents an integer ranging from 1 to 100, preferably ranging from 1 to 10, and more preferably ranging from 1 to 5; and
z represents an integer ranging from 1 to 300, preferably ranging from 1 to 10, and more preferably ranging from 1 to 5.

The aforementioned epoxy-containing group is necessarily present at the side chain of the polysiloxane main chain, but is not necessarily present at the end. The aforementioned epoxy-containing group is never present only at the end of the polysiloxane main chain. The epoxy-containing group is not particularly limited. A glycidoxyalkyl group such as a 2-glycidoxyethyl group, a 3-glycidoxypropyl group, a 4-glycidoxybutyl group or the like; an epoxycycloalkylalkyl group such as a 2-(3,4-epoxycyclohexyl)ethyl group, a 3-(3,4-epoxycyclohexyl)propyl group or the like; and an oxyranylalkyl group such as an oxyranylmethyl group, a 2-oxyranylethyl group, a 4-oxyranylbutyl group, a 8-oxyranyloctyl group or the like are preferable. A glycidoxyalkyl group and an epoxycycloalkylalkyl group are more preferable, and a 3-glycidoxypropyl group and a 2-(3,4-epoxycyclohexyl)ethyl group are, in particular, preferable.

The aforementioned oxyethylene-containing group is preferably represented by a formula: $-(CH_2)_r-(OC_2H_4)_s-(OC_3H_6)_t-B$ wherein B represents H, OH, OR, COOH or COOR in which R is the same as described above; r represents an integer ranging from 0 to 4, and preferably represents an integer ranging from 2 to 4; s represents an integer ranging from 1 to 200, preferably represents an integer ranging from 5 to 100, and more preferably represents an integer ranging from 10 to 50; and t represents an integer which is 0 or more, but less than 200, is preferably 0 or more, but less than 100, and is more preferably 0 or more, but less than 10, and $0 \leq t < s$. As is apparent from the definition of the aforementioned formula, the oxyethylene-containing group may contain an oxypropylene group, but in the case in which an oxypropylene group is present, the ratio of an oxyethylene group/an oxypropylene group preferably exceeds 1, and it is preferable that an oxypropylene group not be present. Therefore, in the aforementioned formula, t=0 is, in particular, preferable.

As the aforementioned epoxy/oxyalkylene-modified silicone, for example,

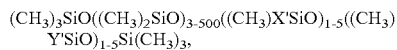

$(CH_3)_3SiO((CH_3)_2SiO)_{3\text{-}500}((CH_3)X'SiO)_{1\text{-}5}((CH_3)Y'SiO)_{1\text{-}5}Si(CH_3)_3$, wherein X' represents a γ-glycidoxypropyl group; and Y' represents $-(CH_2)_3-(OCH_2CH_2)_{10\text{-}50}-OH$, can be used.

It may be believed that instead of using the epoxy/oxyalkylene-modified silicone oil represented by the aforementioned general formula (2), a mixture of an epoxy-modified silicone oil and an oxyalkylene-modified silicone oil might be used. However, in the case in which the non-curable coating composition of the present invention is used in a paper machine, use of an epoxy/oxyalkylene-modified silicone oil, which has affinity with respect to a wet paper provided by an oxyalkylene group together with anti-adhesive properties with respect to adherent contamination components such as pitch, and with respect to paper provided by an epoxy group, has an advantage in view of prevention of adhesion, to a press roll or the like, of the surface of a wet paper containing adherent components such as pitch immediately after producing a paper in the actual steps.

In addition, in the case of using the non-curable coating composition of the present invention is used in a paper machine, the oxyalkylene moiety of the epoxy/oxyalkylene-modified silicone represented by general formula (2) is preferably formed by a polyoxyethylene group, in view of non-adhesive properties to the surface of a press roll, a dryer roll, a canvas and the like of a paper machine.

The non-curable coating composition of the present invention can be produced by mixing the carboxy-modified silicone represented by the aforementioned general formula (1) and the epoxy/oxyalkylene-modified silicone oil represented by the aforementioned general formula (2) in accordance with a conventional method. The mixing ratio represented by the weight ratio of the carboxy-modified silicone represented by the aforementioned general formula (1) and the epoxy/oxyalkylene-modified silicone oil represented by the aforementioned general formula (2) ranges from 1:2 to 1:30, and preferably ranges from 1:3 to 1:20.

In the non-curable coating composition of the present invention, by means of using the carboxy-modified silicone of general formula (1) together with the epoxy/oxyalkylene-modified silicone of general formula (2), releasing effects due to the ability of forming a non-adhesive layer caused by adhesiveness to the surface of a substrate and the ability of preventing adhesion to adherent contamination components such as pitch and the like can be exhibited.

The non-curable coating composition of the present invention may be used by dissolving in an organic solvent. However, in order to reduce environmental burden, a water-in-oil or oil-in-water emulsion form is preferable. In this case, water and an emulsifier may be added to a mixture of the carboxy-modified silicone of general formula (1) and the epoxy/oxyalkylene-modified silicone of general formula (2) to emulsify these. Water and an emulsifier may be added to each of the carboxy-modified silicone of general formula (1) and the epoxy/oxyalkylene-modified silicone of general formula (2) to form preliminary emulsions, and subsequently, they can be mixed to produce a non-curable coating composition in the form of an emulsion. The emulsification method used therein can be carried out by means of conventional means or equipment.

As an emulsifier for preparing the aforementioned emulsion, any emulsifier used in the preparation of a silicone emulsion can be used, and any emulsifier such as an anionic, cationic, amphoteric or nonionic emulsifier can be used. The emulsifier may be used alone or in combination with two or more types thereof.

As examples of anionic surfactants, mention may be made of, for example, saturated or unsaturated higher fatty acid salts such as sodium stearate and the like; long-chain-alkylsulfuric acid salts, alkylbenzenesulfonic acids such as dodecylbenzenesulfonic acid and the like and salts thereof; polyoxyalkylene alkyl ether sulfuric acid salts; polyoxyalkylene alkenyl ether sulfuric acid salts; polyoxyethylene alkylsulfuric acid ester salts: sulfosuccinic acid alkyl ester salts; polyoxyalkylene sulfosuccinic acid salts; long-chain-alkanesulfonic acid salts; polyoxyalkylene alkyl ether acetic acid salts; long-chain-alkyl phosphoric acid salts; polyoxyalkylene alkyl ether phosphoric acid salts; acylglutamic acid salts; alkyloyl alkyl taurine salts; N-acylamino acid salts; alkyl alkyl ether carboxylic acid salts; α-sulfofatty acid ester salts; alanine derivatives; glycine derivatives; arginine derivatives and the like. As examples of the aforementioned salts, mention may be made of alkali metal salts such as sodium salts and the like, alkanolamine salts such as triethanolamine salts and the like, and ammonium salts. Sodium salts are preferable.

As examples of cationic surfactants, mention may be made of, for example, quaternary ammonium salts such as alkyltrimethylammonium salts, dialkyldimethylammonium salts and the like.

As examples of amphoteric surfactants, mention may be made of imidazoline type, aminobetaine type, alkylbetaine type, alkylamidobetaine type, alkylsulfobetaine type, amidosulfobetaine type, hydroxysulfobetaine type, carbobetaine type, phosphobetaine type, aminocarboxylic acid type, and amidoamino acid type amphoteric surfactants.

As examples of nonionic surfactants, mention may be made of, for example, polyoxyalkylene ethers, polyoxyalkylene alkyl ethers, polyoxyalkylene fatty acid esters, polyoxyalkylene fatty acid diesters, polyoxyalkylene resin acid esters, polyoxyalkylene alkylphenols, polyoxyalkylene alkylphenyl ethers, polyoxyalkylene alkyl esters, sorbitan fatty acid esters, polyoxyalkylene sorbitan fatty acid esters, polyoxyalkylene glycerol fatty acid esters, Sucrose fatty acid esters, fatty acid alkanolamides, alkylglucosides, polyoxyalkylene fatty acid bisphenyl ethers, and the like.

In the non-curable coating composition of the present invention, any additives may be blended within a range which does not impair the purposes thereof. As examples of the aforementioned additives, mention may be made of, for example, a viscosity modifier, a pH modifier, an antifoaming agent and the like. The types and blending amounts of the additives can be appropriately adjusted in accordance with usages of the non-curable coating compositions of the present invention.

The non-curable coating composition of the present invention can be used as a coating agent for use in various substrates. The coating agent of the present invention is applied on the surface of a substrate, and thereby, forms a non-adhesive layer on the surface of the aforementioned substrate. Thereby, adhesion of various materials to the surface of the substrate can be prevented or reduced, and contamination of the surface of the aforementioned substrate can be inhibited. The application amount of the coating agent to the surface of the substrate and the concentration of the non-curable coating composition in the coating agent can be appropriately modified in accordance with types, sizes, and the like of the substrates.

The non-curable coating composition of the present invention can be, in particular, suitably used as a contamination inhibitor of a paper machine.

FIG. 1 is a general cross-sectional view showing one example of a general drying step in a paper machine. In general, in the drying step, wet paper W in the form of a web delivered from a press step not shown is provided between dryer roll 1 which is heated and top canvas 7 which is rolling. Wet paper W is pressed on the surface of dryer roll 1 by means of pressure due to top canvas 7 to absorb heat of dryer roll 1. Subsequently, wet paper W is removed from the surface of dryer roll 1 by rolling top canvas 7 and is provided between dryer roll 2 and bottom canvas 8. Here, wet paper W is pressed to the surface of dryer roll 2 by means of pressure due to bottom canvas 8 to further absorb heat of dryer roll 2. Wet paper W is removed from the surface of dryer roll 2 by rolling bottom canvas 8, and is provided between top canvas 7 and dryer roll 3. The aforementioned steps are repeated. As described above, wet paper W is successively pressed to the surface of dryer rolls 1, 2, 3, 4, 5 and 6 by rolling top canvas 7 and bottom canvas 8, and heat of each dryer roll is absorbed, and thereby, wet paper W is gradually dried.

Various components are contained in wet paper W. Such components are pitch and tar contained in raw materials of pulp themselves, ink contained in raw materials of used paper and the like contained in raw materials. Many of the aforementioned components have sticky properties. For this reason, if paper is produced without coating dryer rolls 1, 2, 3, 4, 5, and 6, top canvas 7 and bottom canvas 8, at the time of contacting wet paper W under pressure to dryer rolls 1, 2, 3, 4, 5, and 6, top canvas 7 and bottom canvas 8, the aforementioned components are adhered to the surfaces thereof. Thereby, the aforementioned surfaces are contaminated. In the contaminated dryer rolls and canvases, wet paper W is adhered excessively, and baking or paper breaking occurs. For this reason, a cleaning operation must be carried out on the surface of dryer rolls and canvases by means of a doctor blade or the like. However, in order to carry out a cleaning operation, it is necessary to suspend the paper machine. Therefore, production efficiency of paper products is extremely reduced.

The non-curable coating composition of the present invention can be applied to the surface of a dryer roll and/or canvas, and thereby, a non-adhesive layer is formed on the aforementioned surface to effectively prevent or reduce contamination thereof. More particularly, the application amount thereof can be adjusted so that an emulsion which contains 20% of the non-curable coating composition of the present invention is formed, and it is preferably sprayed so that the amount calculated on the basis of the applied liquid ranges from 0.1 to 50 cc/min and preferably ranges from 1 to 20 cc/min.

In an embodiment shown in FIG. 1, a non-curable coating composition is applied to the surface of each of top canvas 7 and bottom canvas 8 before contacting to wet paper W by means of spray S1 and spray S2, respectively. In addition, the non-curable coating composition is also sprayed on the surface of dryer roll 1 by means of spray S3. Sprays S1, S2, and S3 may be fixing types or are movable in the width direction of the canvas and dryer roll. The non-curable coating composition is preferably also sprayed on the surface of each of dryer rolls 2, 3, 4, 5, and 6. However, if the non-curable coating composition is sprayed to the surface of dryer roll 1, a part of the non-curable coating composition transferred to wet paper W from dryer roll 1 is transferred to the surface of each of dryer rolls 2, 3, 4, 5, and 6. For this reason, the non-curable coating composition may be sprayed only to the surface of dryer roll 1.

As described above, by applying the non-curable coating composition of the present invention to the surface of a dryer roll and a canvas, adhesion of contamination substances such as pitch, tar, ink and the like to the aforementioned surface can be effectively prevented or reduced. For this reason, cleaning frequency for the aforementioned surface can be reduced, and producibility of paper products can be improved.

FIG. 1 only shows the drying step of a paper machine. Even on a press step for producing wet paper in the form of a web by pressing wet paper by means of a press roller in the paper machine, a non-curable coating composition of the present invention can be used. In this case, the non-curable coating composition of the present invention is sprayed to the surface of the aforementioned press roller by means of a spray or the like, and thereby, contamination on the surface of the aforementioned press roller can be prevented. As described above, the non-curable coating composition of the present invention can be suitably used as a contamination inhibitor of a paper machine.

EXAMPLES

Hereinafter, the present invention is described in detail with reference to Examples and Comparative Examples. It should be understood that the present invention is not limited to these Examples. The functional silicone components used in the Examples and Comparative Examples are described below.

Carboxy Oil A (Carboxy-modified Silicone which is Modified at Side Chains):

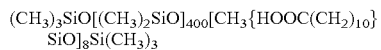

Carboxy oil B (Carboxy-modified Silicone which is Modified at Both Molecular Terminals):

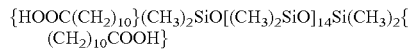

Epoxy/Polyether-modified Silicone M (Epoxy/Polyoxyethylene-modified Silicone which is Modified at Side Chains):

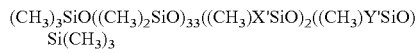

wherein
X'=γ-glycidoxypropyl group
Y'=—$(CH_2)_3$—$OCH_2CH_2)_{12}$—OH

Epoxy/Polyether-modified Silicone N (Epoxy/Polyoxypropylene-modified Silicone which is Modified at Side Chains):

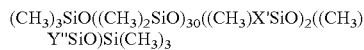

wherein
X'=γ-glycidoxypropyl group
Y''=—$(CH_2)_3$—$(OCH_2CH_2CH_2)_{12}$—OH

Epoxy-modified Silicone:

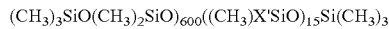

wherein
X'=γ-glycidoxypropyl group

Polyether-modified Silicone:

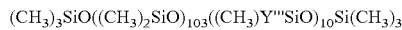

wherein
Y'''=—$(CH_2)_3$—$(OCH_2CH_2O)_{18}$—$(OCH_2CH_2CH_2)_{18}$—OH

Example 1

Carboxy oil A and Epoxy/polyether-modified silicone M in a mixing ratio of 1:7 (2 parts by weight:14 parts by weight) were placed in a container equipped with a propeller type stirrer, and the mixture was stirred for 5 minutes at 300 rpm. In addition, 5 parts by weight of a nonionic emulsifier (polyoxyethylene alkylene ether) was added thereto, and the mixture was stirred for 5 minutes at 300 rpm. Subsequently, 78.94 parts by weight of water was added thereto, and the mixture was further stirred for 60 minutes. Subsequently, while the mixture was stirred at 300 rpm, 0.06 parts by weight of a pH adjustor (sodium carboxylate) was added thereto. After 3 minutes, a translucent pale emulsion was obtained.

Example 1'

A translucent pale emulsion was obtained in the same manner as described in Example 1, with the exception that Carboxy oil A and Epoxy/polyether-modified silicone M were independently emulsified and then the emulsions were mixed.

Comparative Example 1

A white emulsion was obtained by repeating Example 1, with the exception that Epoxy/polyether-modified silicone M was replaced with Epoxy/polyether-modified silicone N.

Comparative Example 2

A white emulsion was obtained by repeating Example 1, with the exception that Epoxy/polyether-modified silicone M was replaced with Epoxy-modified silicone.

Comparative Example 3

A white emulsion was obtained by repeating Example 1, with the exception that Carboxy oil A, Epoxy-modified silicone and Polyether-modified silicone were mixed in a ratio of 1:3.5:3.5.

Comparative Example 4

A white emulsion was obtained by repeating Example 1, with the exception that Epoxy/polyether-modified silicone M was replaced with Polyether-modified silicone.

Comparative Example 5

A white emulsion was obtained by repeating Example 1, with the exception that Epoxy/polyether-modified silicone M was replaced with dimethylpolysiloxane (1,000 cts).

Comparative Example 6

A white emulsion was obtained by repeating Example 1, with the exception that Carboxy oil A was replaced with Carboxy oil B.

Comparative Example 7

A white emulsion was obtained by repeating Example 1, with the exception that Carboxy oil A was replaced with Carboxy oil B, and Epoxy/polyether-modified silicone M was replaced with Epoxy/polyether-modified silicone N.

Comparative Example 8

A white emulsion was obtained by repeating Example 1, with the exception that Epoxy/polyether-modified silicone M was replaced with Carboxy oil A.

Comparative Example 9

A white emulsion was obtained by repeating Example 1, with the exception that both Carboxy oil A and Epoxy/polyether-modified silicone M were replaced with Carboxy oil B.

Comparative Example 10

A white emulsion was obtained by repeating Example 1, with the exception that Carboxy oil A was replaced with Epoxy/polyether-modified silicone M.

Comparative Example 11

A white emulsion was obtained by repeating Example 1, with the exception that both Carboxy oil A and Epoxy/polyether-modified silicone M were replaced with Epoxy/polyether-modified silicone N.

Comparative Example 12

A white emulsion was obtained by repeating Example 1, with the exception that both Carboxy oil A and Epoxy/polyether-modified silicone M were replaced with Epoxy-modified silicone.

Comparative Example 13

A white emulsion was obtained by repeating Example 1, with the exception that both Carboxy oil A and Epoxy/polyether-modified silicone M were replaced with Polyether-modified silicone.

Comparative Example 14

A white emulsion was obtained by repeating Example 1, with the exception that both Carboxy oil A and Epoxy/polyether-modified silicone M were replaced with polydimethylsiloxane (1,000 cts).

[Evaluation 1]

A stainless steel plate (150 mm×50 mm) was provided and heated to 100° C. Subsequently, to one surface of the heated stainless steel plate, about 0.06 g of each of the emulsions of Example 1, Example 1' and Comparative Examples 1 to 14 was sprayed, and uniformly applied thereto by means of Kimwipe. Immediately after the application, a commercially available adhesive fabric tape (manufactured by Teraoka Seisakusho Co., Ltd., No. 159, width=50 mm, length=100 mm) was applied to the aforementioned application surface, while the fabric tape was pressed by a palm and air was blown. In addition, after the plate with the fabric tape was allowed to stand for 25 minutes in an oven at 105° C., the fabric tape was peeled rapidly with bare hands. The degree of peeling at that time was evaluated in view of sensations in the hand on the basis of the following four standards:

1. The tape was extremely lightly peeled, and the peeled surface was also good (superior).
2. The tape was easily peeled, and the peeled surface might be also reused (good).
3. The tape was peeled, but the peeled surface might not be reused (non-usable).
4. The tape could not be peeled, or even if the tape was forced to be peeled, reuse thereof was impossible (cohesiveness).

As a control, the case in which no emulsion was applied was also evaluated. The results are shown in Table 1.

From the results shown in Table 1, it can be seen that a combination between Carboxy oil A having carboxy groups at the side chains and Epoxy/polyether-modified silicone M having an epoxy group and a polyoxyethylene group at the side chains can form a non-adhesive layer which exhibits good detachability and durability for practical use on a substrate. In contrast, it can be seen that examples using Carboxy oil B having carboxy groups only at both ends and Epoxy/polyether-modified silicone N having an epoxy group and a polyoxypropylene group at the side chains form a non-adhesive layer which exhibits poor detachability and non-durability for practical use.

Examples 2 to 9 and Comparative Examples 15 to 17

White emulsions were obtained by repeating Example 1, with the exception that the blending ratios of Carboxy oil A and Epoxy/polyether-modified silicone M were replaced as shown in Table 2 (in Table 2, the numerical value in parentheses is on the basis of g). The obtained emulsions were subjected to the same evaluation as described above. The results are shown in Table 2.

TABLE 2

| Example | Comp. Example | Carboxy oil A | Epoxy/polyether-modified silicone M | Evaluation result |
|---|---|---|---|---|
| — | 15 | 1 (8.0) | 1 (8.0) | 3 |
| 2 | — | 1 (5.3) | 2 (10.7) | 2 |
| 3 | — | 1 (4.0) | 3 (12.0) | 1 |
| 4 | — | 1 (2.7) | 5 (13.3) | 1 |
| 5 | — | 1 (1.6) | 9 (14.4) | 1 |
| 6 | — | 1 (1.5) | 10 (14.5) | 1 |
| 7 | — | 1 (1.0) | 15 (15.0) | 1 |
| 8 | — | 1 (0.8) | 20 (15.2) | 1 |
| 9 | — | 1 (0.5) | 30 (15.5) | 2 |
| — | 16 | 1 (0.3) | 50 (15.7) | 3 |
| — | 17 | 1 (0.2) | 100 (15.8) | 3 |

From the results shown in Table 2, it can be seen that when a mixing ratio (weight ratio) between Carboxy oil A and Epoxy/polyether-modified silicone M ranges from 1:2 to 1:30, good releasing property can be exhibited, and among these, a range of from 1:3 to 1:20 exhibits particularly superior releasing property.

TABLE 1

| | Example | | Comparative Example | | | | | | | | | | | | | | |
|---|---|---|---|---|---|---|---|---|---|---|---|---|---|---|---|---|---|
| | 1 | 1' | 1 | 2 | 3 | 4 | 5 | 6 | 7 | 8 | 9 | 10 | 11 | 12 | 13 | 14 | Control |
| Carboxy oil A | ○ | ○ | ○ | ○ | ○ | ○ | ○ | | | ○ | | | | | | | |
| Carboxy oil B | | | | | | | | ○ | ○ | | ○ | | | | | | |
| Epoxy/polyether-modified silicone M | ○ | ○ | | | | | | ○ | | | | ○ | | | | | |
| Epoxy/polyether-modified silicone N | | | | ○ | | | | | ○ | | | | ○ | | | | |
| Epoxy-modified silicone | | | | | ○ | ○ | | | | | | | | ○ | | | |
| Polyether-modified silicone | | | | | ○ | ○ | | | | | | | | | ○ | | |
| Polydimethylsiloxane (1,000 Cst) | | | | | | | ○ | | | | | | | | | ○ | |
| Evaluation results | 1 | 1 | 3 | 4 | 2 | 3 | 3 | 2 to 3 | 4 | 4 | 4 | 3 | 4 | 4 | 3 | 4 | 4 |

[Evaluation 2]

Effects of the emulsion of Example 1 were verified under conditions for producing a paper described below, using a paper machine having drying steps shown in FIG. 1.

(Condition 1 of Producing Paper)
Paper-types: white paperboard
Basis weight: 300 to 550 g/m$^2$
Paper width: 2,000 mm
Emulsion-spraying site: Dryer roll 1
Emulsion-spraying amount: 170 cc/min (a liquid obtained by diluting the translucent pale emulsion of Example 1 with water 100 times)
Emulsion-spraying method: 11 fixing-type spray nozzles
Rate of producing paper: 700 to 1,300 m/min
Effects: Contamination on the surface of a dryer roll was ameliorated. In particular, in the case of failing to use the aforementioned emulsion, cleaning of the surface of the dryer roll by means of a doctor blade must be carried out 3 times per month, but by using the emulsion of the present invention, the cleaning frequency reduced once per two months. Thereby, frequency of suspending operations remarkably reduced, and operation efficiency was clearly improved.

(Condition 2 of Producing Paper)
Paper-types: inner sheet base paper
Daily production: 520 t
Basis weight: 160 to 180 g/m$^2$
Paper width: 4,400 mm
Emulsion-spraying site: Dryer roll 1
Emulsion-spraying amount: 5 cc/min (a liquid obtained by diluting the translucent pale emulsion of Example 1 with water 4 times)
Emulsion-spraying method: 1 self-propelled type spray nozzle
Rate of producing paper: maximum 500 m/min
Effects: Prevention of contamination adhesion could be realized with a reduced addition amount, compared with the amount of a polydimethylsiloxane oil-based emulsion conventionally used (used in Comparative Example 14). More particularly, in the case of using the polydimethylsiloxane-based emulsion, it was necessary to clean the surface of a dryer roll by means of a doctor blade once a month. In contrast, in the case of using the emulsion of the present invention (which had the same amount of solid content), the cleaning operation was not necessary for half a year. Thereby, suspension frequency during operation was remarkably reduced, and operation efficiency was clearly improved. In addition, an adhesion moiety between paper and the surface of the dryer roll was almost absent, and no influence to paper properties was given. For these reasons, the papermaking rate could be improved.

(Condition 3 of Producing Paper)
Paper-types: liner paper
Basis weight: 180 to 200 g/m$^2$
Paper width: 4,000 mm
Emulsion-spraying site: Canvas
Emulsion-spraying amount: 800 cc/min (a liquid obtained by diluting the translucent pale emulsion of Example 1 with water 100 times)
Emulsion-spraying method: 16 fixing-type spray nozzles
Rate of producing paper: 800 to 900 m/min
Effects: Adhesion of contamination such as paper powder, pitch and the like was extremely reduced, as compared to an emulsion of an amino-modified silicone base (amino group-containing polydimethylsiloxane having an amino equivalent of 3,800, and a viscosity of 1,800 cps) which was conventionally used, and drying efficiency and paper quality were improved. As a result, the rate of producing paper was able to be increased by 5%.

The emulsion of the present invention exhibits superior effects of preventing adhesion of contamination on the surface of a dryer roll in the step of producing paper and superior effects of preventing adhesion of paper to the surface of the dryer roll, as compared to a general emulsion in which a polydimethylsiloxane is based. Therefore, the emulsion of the present invention is useful as a contamination inhibitor in which adhesion of paper powder, pitch and the like to the surface of a dryer roll can be prevented in the step of producing paper and paper quality and paper productivity can be improved.

INDUSTRIAL APPLICABILITY

The non-curable coating composition of the present invention can be used in wide fields as a coating agent for various substrates such as molds for molding rubber or plastic (such as a mold release agent) products. In particular, the non-curable coating composition of the present invention can be suitably used as a contamination inhibitor in order to prevent or reduce adhesion of contamination substances such as pitch, tar, ink and the like to a press roll, a dryer roll, a canvas and the like used in a paper production machine.

The invention claimed is:

1. A non-curable coating composition comprising:
   a carboxy-modified silicone represented by the following general formula (1):

$$R_3SiO(R_2SiO)_m(RASiO)_nSiR_3 \quad (1)$$

wherein
each R independently represents a $C_{1-6}$ alkyl group;
A represents a carboxy-containing group;
m represents an integer ranging from 0 to 1,000; and
n represents an integer ranging from 2 to 100,
and
an epoxy/oxyalkylene-modified silicone represented by the following general formula (2):

$$R_{3-p}X_pSiO(R_2SiO)_x(RXSiO)_y(RYSiO)_zSiX_qR_{3-q} \quad (2)$$

wherein
each R independently represents a $C_{1-6}$ alkyl group;
X represents an epoxy-containing group;
Y represents an oxyethylene-containing group;
p represents 0 or 1;
q represents 0 or 1;
x represents an integer ranging from 0 to 500;
y represents an integer ranging from 1 to 100; and
z represents an integer ranging from 1 to 300,
A weight ratio of the carboxy-modified silicone represented by the general formula (1) to the epoxy/oxyalkylene-modified silicone oil represented by the general formula (2) in a ranging from 1:2 to 1:30.

2. The non-curable coating composition according to claim 1, wherein said carboxy-containing group is represented by a formula:—$(CH_2)_l$—COOZ wherein Z represents H, an alkali metal or ammonium; and l represents an integer ranging from 0 to 12.

3. The non-curable coating composition according to claim 2, wherein said epoxy-containing group is a glycidoxyalkyl group, an epoxycycloalkylalkyl group, or an oxiranylalkyl group.

4. The non-curable coating composition according to claim 3, wherein said oxyethylene-containing group is represented by a formula:—$(CH_2)_r$—$(OC_2H_4)_s$—$OC_3H_6)_t$—B wherein B represents H, OH, OR, COOH or COOR wherein R is the same group as described above; r represents an integer ranging from 0 to 4; s represents an integer ranging from 1 to 200; t represents an integer of 0 or more, but less than 200; and $0 \leq t < s$.

5. The non-curable coating composition according to claim 2, wherein said oxyethylene-containing group is represented by a formula: $-(CH_2)_r-(OC_2H_4)_s-(OC_3H_6)_t-B$ wherein B represents H, OH, OR, COOH or COOR wherein R is the same group as described above; r represents an integer ranging from 0 to 4; s represents an integer ranging from 1 to 200; t represents an integer of 0 or more, but less than 200; and $0 \leq t < s$.

6. The non-curable coating composition according to claim 1, wherein said epoxy-containing group is a glycidoxyalkyl group, an epoxycycloalkylalkyl group, or an oxiranylalkyl group.

7. The non-curable coating composition according to claims 1, wherein said oxyethylene-containing group is represented by a formula: $-(CH_2)_r-(OC_2H_4)_s-(OC_3H_6)_t-B$ wherein B represents H, OH, OR, COOH or COOR wherein R is the same group as described above; r represents an integer ranging from 0 to 4; s represents an integer ranging from 1 to 200; t represents an integer of 0 or more, but less than 200; and $0 \leq t < s$.

8. The non-curable coating composition according to claim 1, wherein said weight ratio ranges from 1:3 to 1:20.

9. The non-curable coating composition according to claim 1, which is in the form of an oil-in-water emulsion or a water-in-oil emulsion.

10. A coating agent for forming a non-adhesive layer, said coating agent comprising the non-curable coating composition according to claim 1.

11. A contamination inhibitor for use in a paper machine, said contamination inhibitor comprising the non-curable coating composition according to claim 1.

* * * * *